Nov. 16, 1937.     R. B. BAGBY     2,099,252
FILLING MACHINE
Filed Jan. 13, 1936
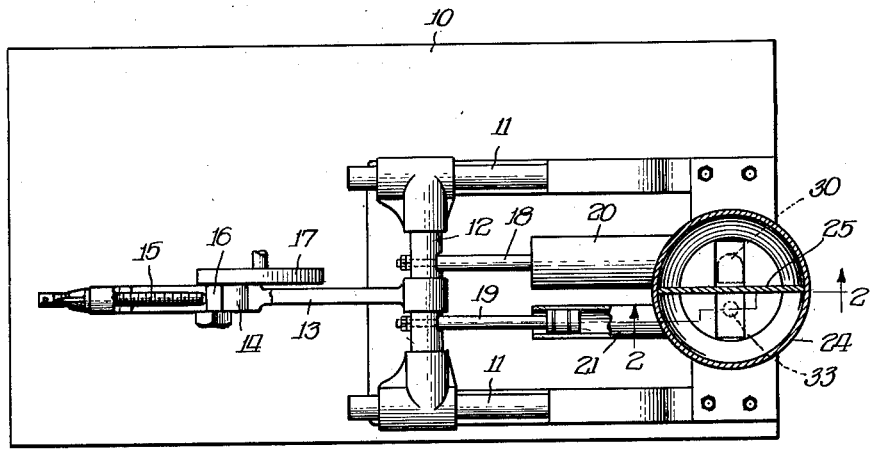
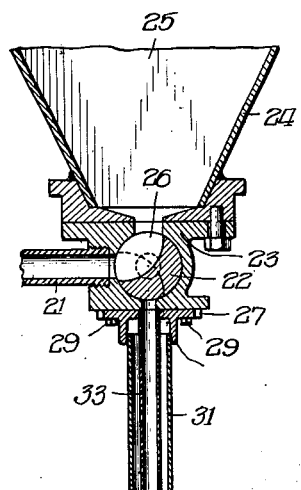
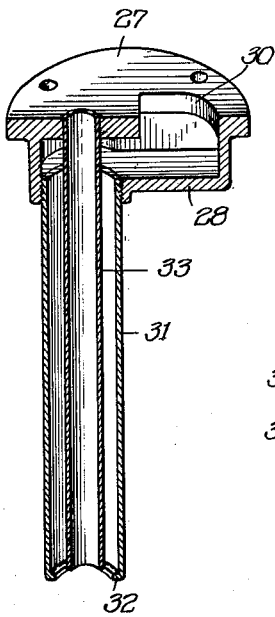
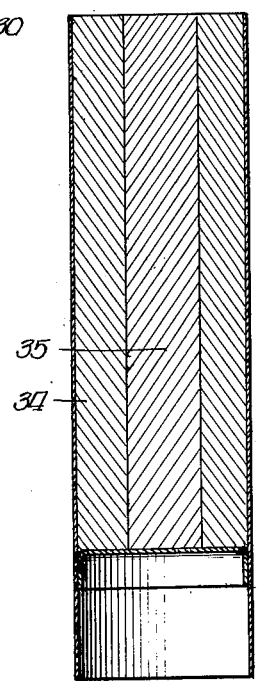
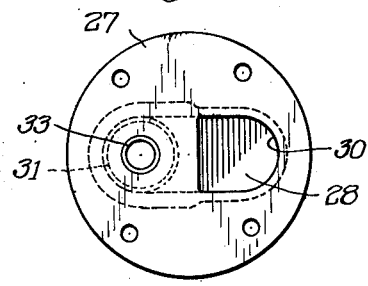
Inventor:
Ralph B. Bagby,
By Moosey + Moosey
attys.

Patented Nov. 16, 1937

2,099,252

UNITED STATES PATENT OFFICE 2,099,252

FILLING MACHINE

Ralph B. Bagby, Evanston, Ill.

Application January 13, 1936, Serial No. 58,800

3 Claims. (Cl. 226—100)

My invention relates to filling machines and particularly to a construction adapted for the filling of packages such as hereinafter described.

It has long been the practice to provide multiple fillers by means of which two different substances may be supplied to the same or different containers, such machines involving the use of a plurality of cylinders and a hopper divided into sections, to which sections the different materials are supplied and segregated.

My invention relates to apparatus adapted for use in filling containers in the manner shown in Fig. 5 of the drawing hereof, in which ice cream is filled into an elongated paper carton along with a center or core of a chocolate confection in the nature of a candy. The difficulty encountered was that of devising means whereby the described filling operation might be carried out in automatic or semi-automatic machines. It will be understood that the relative volumes of the two substances is considerably different, there being approximately four times as great volume of ice cream as of candy. In order to obviate the necessity for mechanism that would effect a variation of stroke of one of the filling cylinders, I conceived the idea of proportioning the cylinders in cross sectional areas to the quantities of the respective materials. Also in order to maintain a relatively sharp line of division between the core and the body of the confection package, I devised a filling nozzle or spout in which two concentric tubes were connected to the respective cylinder openings, with very satisfactory results.

The invention will be more readily understood by reference to the accompanying drawing; in which, Fig. 1 is a plan view of a portion of the operating mechanism of a filling machine constructed in accordance with my invention;

Fig. 2 is a sectional view through a portion of the hopper, the valve, a cylinder and the filling nozzle;

Fig. 3 is a sectional perspective view, somewhat enlarged, of the filling nozzle;

Fig. 4 is a plan view thereof; and,

Fig. 5 is a sectional view through a filled package such as contemplated, the view being enlarged to substantially twice the proportions of Fig. 3.

In the drawing I have illustrated, in Fig. 1, a portion of a filling machine consisting of a base 10 on which are mounted slides 11 for a cross head 12, the cross head being operated by a pitman 13 having a slot 14 therein, closed at one end by an adjusting screw 15. A stud 16 is mounted in the slot, the stud being carried by a disc 17 which may be rotated in any suitable manner. This mechanism was first illustrated in my copending application, Serial No. 635,621, filed September 30, 1932.

Connected to the cross head are piston rods 18, 19 carrying pistons at their ends which are seated in cylinders 20, 21. It will be noted that the cylinder 21 is much smaller than the cylinder 20, being in this case only about one-fourth of its capacity.

A valve 22 is seated in a casting 23 suitably held on the base and within which the cylinders 20, 21 are screw threaded. Above the valve and also carried by the casting 23 is a hopper 24 having a division wall 25 therein. The valve element is of the rotary, three-way type and is actuated in timed relation to the pistons by mechanism, not shown. The arrangement is such that when the valve is positioned as shown in Fig. 2 the passage 26 therein places the hopper supply of material in communication with the cylinder 21; when in the dotted line position of Fig. 2 the cylinder is in communication with the outlet through the nozzle. The valve contains two separate side by side passages, serving the two cylinders.

The filling spout or nozzle consists of a chambered body having a flanged upper wall 27 and a lower wall 28, the body being secured to the casting 23 by suitable bolts 29. The upper wall 27 has an opening 30 that registers substantially with the outlet from the cylinder 20 through the corresponding valve opening while the wall 28 has an opening out of vertical alignment with the opening 30 and threaded to receive a filling tube 31. The lower end of the tube 31 has an inturned lip 32 for facilitating the cut-off of the discharged material. Seated in an opening in the upper wall is a second tube 33 arranged concentrically of the tube 31, the opening into the inner tube registering with the outlet from the cylinder 21 through the valve, as shown in Fig. 2.

The arrangement is such that as the pistons are retracted, a predetermined quantity of the respective materials is drawn thereinto, while on the return movement of the pistons the said materials are discharged directly into the container shown in Fig. 5, the ice cream which is of greater bulk being discharged through the opening 30 into the chamber in the casting, thence downwardly through the tube 31 taking the position as indicated at 34 in Fig. 5. Simultaneously the other material is discharged from the cylinder 21 downwardly through the central tube 33 taking the position shown at 35 in Fig. 5. Thus the materials are maintained in a segregated and previously defined position in the package.

While I have shown the respective filling tubes as circular in cross section, it will be understood that this is a matter of choice; one might be round, the other square or both square or the internal tube might take other shapes in order to produce a package having unusual decorative features. These and other modifications are considered within the scope of my invention.

I claim:

1. In a filling machine, the combination of a pair of cylinders, pistons therefor, means for effecting a simultaneous uniform stroke of said pistons, two segregated sources of supply of material, three-way-valve means for placing the sources of supply in communication with respective cylinders and said cylinders in communication with a divided outlet, and a filling nozzle at said outlet, said nozzle providing a tubular central passage for material from one cylinder and a surrounding tubular passage for material from the other cylinder.

2. In a filling machine, the combination of a pair of cylinders, having different cross sectional areas, pistons therefor, means for effecting a simultaneous uniform stroke of said pistons, two segregated sources of supply of material, three-way-valve means for placing the sources of supply in communication with respective cylinders and said cylinders in communication with divided outlet, and a filling nozzle at said outlet, said nozzle providing a tubular central passage for material from one cylinder and a surrounding tubular passage for material from the other cylinder.

3. In a filling machine, the combination of a pair of cylinders, having different cross sectional areas, pistons therefor, means for effecting a simultaneous uniform stroke of said pistons, two segregated sources of supply of material, three-way-valve means for placing the sources of supply in communication with respective cylinders and said cylinders in communication with divided outlet, and a filling nozzle at said outlet, said nozzle providing a tubular central passage for material from the cylinder of smaller cross section and a surrounding passage for material from the other cylinder.

RALPH B. BAGBY.